(12) United States Patent
Alfani et al.

(10) Patent No.: US 8,618,195 B2
(45) Date of Patent: Dec. 31, 2013

(54) SOLID MIXTURE AND COATING BASED ON A SULFO-ALUMINOUS OR SULFO-FERROALUMINOUS CLINKER AND CEMENTITIOUS-BASED PIPES THUS COATED

(75) Inventors: Roberta Alfani, Bergamo (IT); Gianluca Lezzi, Bergamo (IT)

(73) Assignee: Italcementi S.p.A., Bergamo (IT)

( * ) Notice: Subject to any disclaimer, the term of this patent is extended or adjusted under 35 U.S.C. 154(b) by 497 days.

(21) Appl. No.: 12/735,519

(22) PCT Filed: Jan. 31, 2008

(86) PCT No.: PCT/IB2008/000299
§ 371 (c)(1),
(2), (4) Date: Sep. 9, 2010

(87) PCT Pub. No.: WO2009/095734
PCT Pub. Date: Aug. 6, 2009

(65) Prior Publication Data
US 2010/0330318 A1 Dec. 30, 2010

(51) Int. Cl.
*C04B 28/06* (2006.01)
*C04B 28/16* (2006.01)
*C04B 40/00* (2006.01)

(52) U.S. Cl.
USPC ....... 524/2; 524/37; 524/42; 524/77; 524/543

(58) Field of Classification Search
USPC .............................. 524/31, 2, 37, 42, 77, 543
See application file for complete search history.

(56) References Cited

U.S. PATENT DOCUMENTS

| | | | |
|---|---|---|---|
| 3,854,985 A | 12/1974 | Suzuki | |
| 2005/0235878 A1* | 10/2005 | Podlas | 106/618 |
| 2007/0074642 A1* | 4/2007 | Amathieu et al. | 106/695 |
| 2008/0300343 A1* | 12/2008 | Becker et al. | 524/5 |
| 2009/0192242 A1 | 7/2009 | Willimann | |

FOREIGN PATENT DOCUMENTS

| | | |
|---|---|---|
| DE | 44 34 322 A1 | 3/1995 |
| DE | 4434322 A1 * | 3/1995 |
| DE | 10 2005 012986 A1 | 9/2006 |
| DE | 102005053019 A1 | 5/2007 |
| EP | 0 900 771 A | 3/1999 |
| WO | WO98/58886 A | 12/1998 |
| WO | WO01/28955 A | 4/2001 |
| WO | WO 2005040062 A1 * | 5/2005 |
| WO | WO2005/070849 A | 8/2005 |
| WO | WO2006/099742 A | 9/2006 |
| WO | WO 2006099960 A1 * | 9/2006 |

* cited by examiner

*Primary Examiner* — Kelechi Egwim
(74) *Attorney, Agent, or Firm* — Hedman & Costigan, P.C.; James V. Costigan; Kathleen A. Costigan

(57) ABSTRACT

The present invention relates to a solid mixture and a coating or painting based on a sulfo-aluminous or sulfo-ferroaluminous clinker, the relative use as coating or painting of cementitious- and non-cementitious-based supports, in particular as coating or painting of cementitious-based pipes.

28 Claims, 3 Drawing Sheets

SOLID MIXTURE AND COATING BASED ON A SULFO-ALUMINOUS OR SULFO-FERROALUMINOUS CLINKER AND CEMENTITIOUS-BASED PIPES THUS COATED

The present invention relates to a solid mixture based on a sulfo-aluminous or sulfo-ferroaluminous clinker, coatings or paintings based on sulfo-aluminous or sulfo-ferroaluminous clinker and cementitious-based pipes, thus coated.

Concrete is one of the most widely-used materials for the production of piping for sewers and drainage systems. New pipes made of a cementitious-based material extruded with fine thicknesses for sewerage systems have recently been developed.

All products for cementitious-based piping are traditionally considered as being "inferior" with respect to other systems such as stoneware both in terms of durability and resistance to chemical attack. It is known in fact that, according to the indications of the regulation UNI EN 295 $3^{rd}$ part, stone piping has a high durability when subjected to the aggressive action of strongly acid environments; cement sewerage systems, on the contrary, are particularly sensitive to acid attack, so much so that only use at pH higher than 4-5 is suggested for problems of degradation of the internal surface. This problem, which is already significant for concrete piping having thicknesses greater than a centimeter, becomes particularly important for extruded pipes made of fibre cement where the aggressive action of the acid is exerted on particularly fine thicknesses (20-25 mm for internal diameters DN=300 mm), at least half of analogous concrete diameters, causing a weight percentage loss of about 5% (see the photo provided in FIG. 1 which represents a section of non-coated pipe after immersion in acid).

Processes which lead to degradation of the internal walls of piping following chemical attack are complex [1-3]; it is possible to affirm, in simplified terms, that particularly acid conditions can be created due to bacterial activity of both the anaerobic and aerobic type, which produces acid. Anaerobic bacteria in fact reduce the sulfurated compounds present in hydrogen sulfide ($H_2S$), which, as it is gaseous, is released into the air overlying the surface of the liquid; the hydrogen sulfide oxidizes in the presence of oxygen, to elemental sulfur (S), which in turn tends to be deposited on the walls of the pipe. At this point again as a result of anaerobic bacteria, in particular *Thiobacillus*, the sulfur is oxidized to sulfuric acid ($H_2SO_4$)

Sulfuric acid is mainly responsible for the degradation of cementitious-based piping as it reacts with portlandite (Ca(OH)$_2$) and with the other compounds present in the cementitious paste according to the following reactions.

$$Ca(OH)_2 + H_2SO_4 \rightarrow CaSO_4 \cdot 2H_2O \quad [1]$$

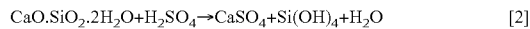

$$CaO \cdot SiO_2 \cdot 2H_2O + H_2SO_4 \rightarrow CaSO_4 + Si(OH)_4 + H_2O \quad [2]$$

The calcium sulfate formed is in turn capable of corroding the compounds present in the cementitious paste with the formation of ettringite, as indicated below.

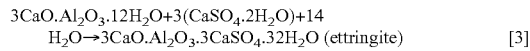

$$3CaO \cdot Al_2O_3 \cdot 12H_2O + 3(CaSO_4 \cdot 2H_2O) + 14 H_2O \rightarrow 3CaO \cdot Al_2O_3 \cdot 3CaSO_4 \cdot 32H_2O \text{ (ettringite)} \quad [3]$$

Attack on the part of sulfuric acid is certainly the greatest problem to be solved for the use of cementitious piping, for example, in the sewerage system: this attack in fact takes place with the simultaneous action of the $H_3O^+$ ion and $SO_4^-$ ion, which involve not only the portlandite and aluminates, which are transformed into gypsum and ettringite respectively, but also the basic calcium silicate hydrates (CSH) responsible for the mechanical resistance of the cementitious-based compounds.

In order to overcome this problem, the state of the art describes two types of coating systems which are the most widely-used for cementitious-based pipes and accessories (www.assobeton.it: Publications: Pipe Section "Tubazioni in calcestruzzo—Guides and Manual ASSOBETON"—2005).

a) paints and
b) plastic coatings

In the former case these are epoxy, polyurethane epoxy or tar-epoxy paints, applied by spraying inside the end-product. These systems are capable of providing the end-products with chemical resistance, but require an adequate support for a good adherence and not becoming subsequently detached due to their fine thickness (less than 400 μm).

In the second case, these are laminas of sprayed polyethylene, polypropylene, polyurethane or of injected polyurethane resins; these systems however require the use of a considerable amount of labour in the application phase and are disadvantageous from an economic point of view.

In particular, in the case of extruded cement pipes, the application of a synthetic resin, capable of resisting chemical attack in strongly aggressive environments, has a serious drawback because, as the internal surfaces of the pipes are particularly smooth, problems arise of adhesion of the synthetic resin to the cementitious support: the synthetic resin in fact tends to become detached from the wall of the pipe in the form of fine flakes, as can be seen in the photo provided in FIG. 2 which represents an extruded pipe treated with epoxy resin. The detachment points of the resin become preferred points for acid attack and therefore degradation of the pipe.

Consequently, the solutions of the known art have not solved the problem of obtaining a coating for cementitious substrates, in particular for extruded cementitious pipes, which has a high resistance to acid attack, also at a pH of approximately 1.

The present invention therefore proposes to find a coating which overcomes these disadvantages.

An object of the present invention relates to a solid composition based on a calcium sulfo-aluminous or calcium sulfo-ferroaluminous clinker, which comprises the following components:
a) a calcium sulfo-aluminous or sulfo-ferroaluminous clinker in a quantity ranging from 15 to 95% by weight with respect to the total weight of the composition;
b) at least one rheology-modifying agent, preferably derivatives of cellulose ethers, with viscosity values ranging from 2000 mPa·s and 120000 mPa·s;
c) at least one adhesion agent, preferably copolymers based on vinyl acetate, vinyl versatate and butyl acrylate;
d) at least one superfluidifying agent, preferably of a polycarboxylic nature.

In particular, said composition according to the present invention comprises:
a) a calcium sulfo-aluminous or sulfo-ferroaluminous clinker in a quantity ranging from 15 to 95% by weight with respect to the total weight of the composition;
b) at least one rheology-modifying agent, in a quantity ranging from 0.01% to 3% by weight with respect to the total weight of the composition;
c) at least one adhesion agent, in a quantity ranging from 0.1% to 10% by weight with respect to the total weight of the composition;
d) at least one superfluidifying agent, in a quantity ranging from 0.1% to 10% by weight with respect to the total weight of the composition;

e) the total to 100 consisting, when necessary, of at least one component selected from anhydrite or gypsum, various kinds of aggregates, mineral or pozzolanic additions, pigments of an organic and/or inorganic nature and/or an ordinary cement according to the regulation EN 197-1 (2006).

A further object of the present invention relates to a coating based on a calcium sulfo-aluminous or calcium sulfo-ferroaluminous clinker, which comprises the following components:
a) a calcium sulfo-aluminous or sulfo-ferroaluminous clinker in a quantity ranging from 15 to 95% by weight with respect to the total weight of the composition (excluding the pasting water);
b) at least one rheology-modifying agent, preferably derivatives of cellulose ethers, with viscosity values ranging from 2000 mPa·s and 120000 mPa·s;
c) at least one adhesion agent, preferably copolymers based on vinyl acetate, vinyl versatate and butyl acrylate;
d) at least one superfluidifying agent, preferably of a polycarboxylic nature.
f) water in such a quantity that the water/binder ratio ranges from 0.4 to 0.9.

In particular, an object of the present invention relates to a coating based on a calcium sulfo-aluminous or calcium sulfo-ferroaluminous clinker which comprises the following components:
a) a calcium sulfo-aluminous or sulfo-ferroaluminous clinker in a quantity ranging from 15 to 95% by weight with respect to the total weight of the composition (excluding the pasting water);
b) at least one rheology-modifying agent, preferably derivatives of cellulose ethers, with viscosity values ranging from 2000 mPa·s to 120000 mPa·s, said modifying agent being present in a quantity ranging from 0.01% to 3% by weight with respect to the total weight of the composition (excluding the pasting water);
c) at least one adhesion agent, preferably copolymers based on vinyl acetate, vinyl versatate and butyl acrylate, in a quantity ranging from 0.1% to 10% by weight with respect to the total weight of the composition (excluding the pasting water);
d) at least one superfluidifying agent, preferably of a polycarboxylic nature, in a quantity ranging from 0.1% to 10% by weight with respect to the total weight of the composition (excluding the pasting water);
f) water in such a quantity that the water/binder ratio ranges from 0.4 to 0.9.

A further object of the invention relates to the solid mixture of the additives b), c) and d) of the solid composition according to the present invention. In this case, component b) is present in a quantity ranging from 0.5% to 20% by weight with respect to the total weight of the mixture of additives b), c) and d); component c) is present in a quantity ranging from 30% to 85% by weight of the mixture of additives b), c) and d); component d) is present in a quantity ranging from 5% to 60% of the mixture of additives b) c) and d).

An object of the present invention also relates to the use of the coating based on a calcium sulfo-aluminous or calcium sulfo-ferroaluminous clinker as a coating or painting of cementitious and non-cementitious-based supports, in particular as a coating or painting of cementitious-based pipes.

A further object of the present invention consists of a cementitious pipe coated with a coating based on a calcium sulfo-aluminous or calcium sulfo-ferroaluminous clinker.

One of the advantages of the coating according to the present invention is that it surprisingly has a rheological behaviour which allows it to be easily applied either by spraying or with a brush, in fine thicknesses, to supports of a cementitious and non-cementitious nature; said coating also provides the end-products with improved resistance to acid attack, as can be observed in the photos of FIGS. 3 and 4, which show sections of coated pipe before and after immersion in acid.

BRIEF DESCRIPTION OF THE SEVERAL VIEWS OF THE DRAWINGS

FIG. 3 is a photograph taken before immersion in acid and FIG. 4 is a photograph taken after immersion in acid.

Figure 1:
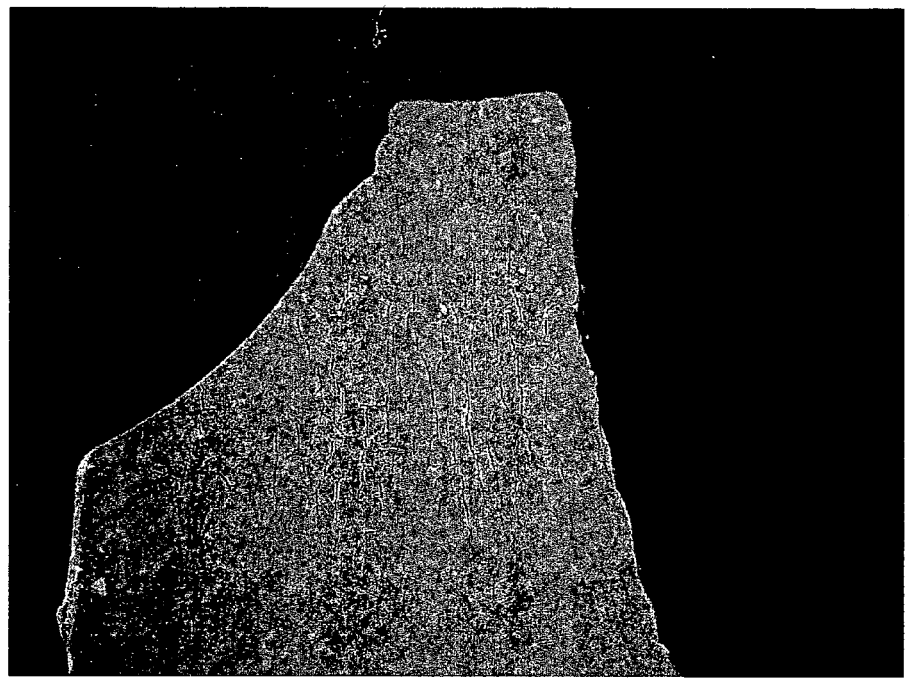
FIG. 1 is a photograph of a non-coated fibre cement pipe that shows a 5 wt % loss after immersion in acid.
Figure 2:
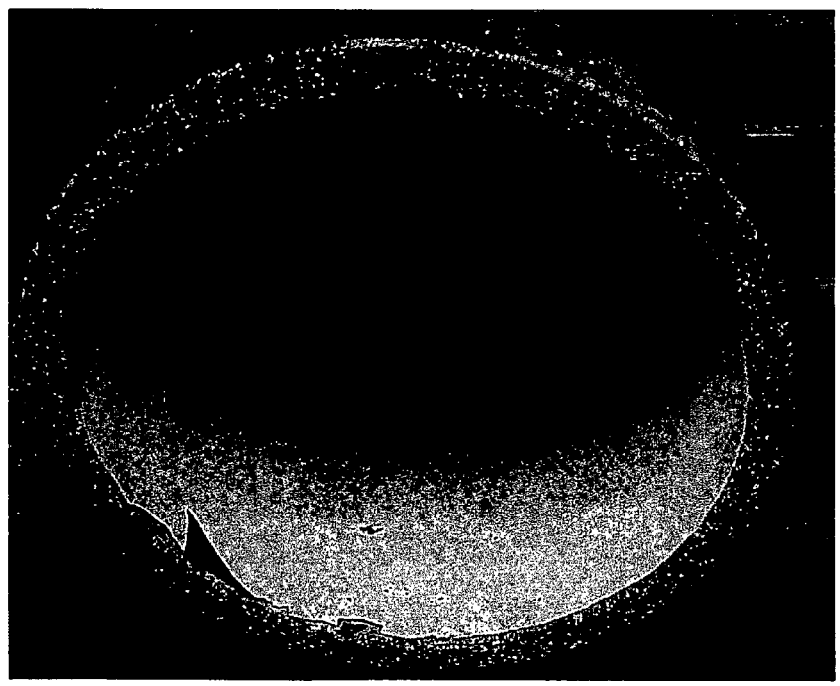
FIG. 2 is a photograph of an extruded pipe treated with epoxy resin.
Figure 3:
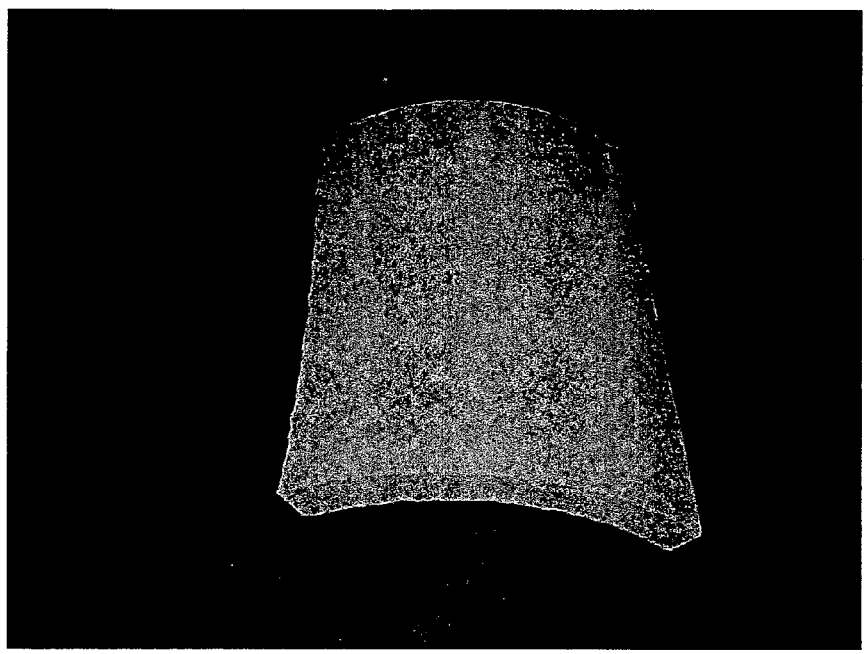
FIGS. 3 and 4 are photographs of coated pipe where
Figure 4:
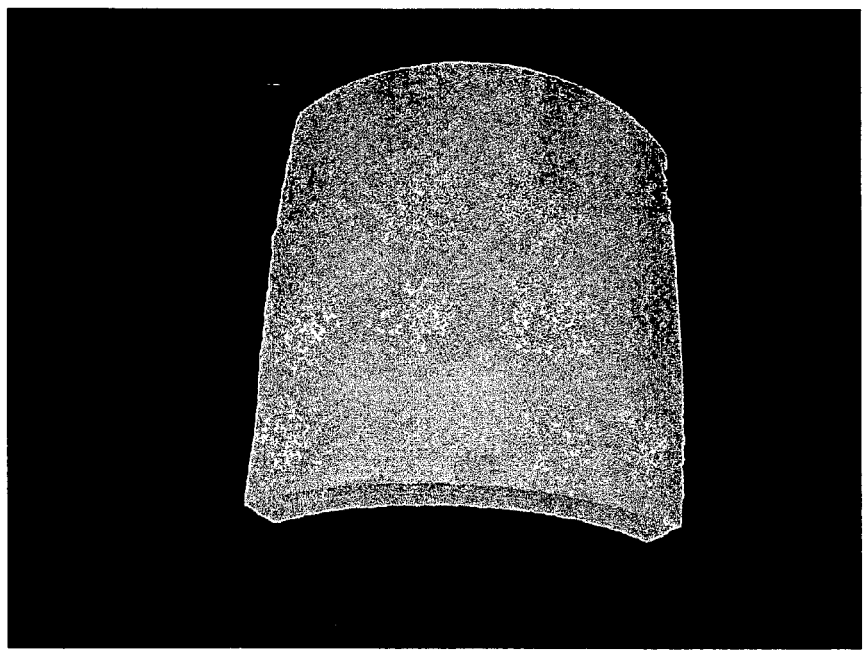

The calcium sulfo-aluminous or calcium sulfo-ferroaluminous clinker is present in the solid composition or coating according to the present invention in a quantity preferably ranging from 20 to 90% and more preferably from 40 to 85% by weight with respect to the total weight of the composition (excluding the pasting water).

The compounds described in the patents and/or patent applications WO2006/18569, EP-A-1306356 and EP-A-0181739 can be used as suitable calcium sulfo-aluminous clinkers in the solid composition or coating according to the present invention, as also the calcium sulfo-aluminous clinkers described in the Review "Green Chemistry for sustainable cement production and Use" by John W. Phair Green Chem., 2006, 8, 763-780, in particular in chapter 5.3 on page 776, and also the calcium sulfo-aluminous clinkers described in the article "Calcium sulfoaluminates cements—low energy cements, special cements or what?" J. H. Sharp et al., Advances in Cement Research, 1999, 11, Nr. 1, pages 3-13. Alternatively, sulfo-ferroaluminous clinkers can also be suitably used as described in Advances in Cement Research, 1999, 11, Nr. 1, January, 15-21.

The rheology modifying agent present in the solid composition or in the coating according to the present invention is preferably a derivative of cellulose ethers with non-ionic alkyl substituents.

The rheology modifying agent present in the solid composition or in the coating according to the present invention has viscosity values, measured with a Brookfield apparatus in aqueous solutions at 2% by weight, ranging from 2000 mPa·s and 120000 mPa·s, preferably from 15000 mPa·s and 90000 mPa·s, more preferably from 30000 mPa·s and 70000 mPa·s.

The rheology modifying agent present in the solid composition or in the coating according to the present invention is present in a quantity ranging from 0.01% to 3%, preferably from 0.02% to 1.5%, more preferably from 0.05% to 1.0% by weight with respect to the total weight of the composition (excluding the pasting water).

The adhesion agent in the solid composition or coating according to the present invention is present in a quantity ranging from 0.1% to 10%, preferably from 0.5% to 8%, more preferably from 1% to 6% by weight with respect to the total weight of the composition (excluding the pasting water).

Said adhesion component can be in the form of powder and/or liquid; in the former case the adhesion agent is mixed together with the other dry components of the formulation, in the latter case, it is preferably added to the pasting water.

The superfluidifying agent in the solid composition or coating according to the present invention is present in a quantity ranging from 0.1% to 10%, preferably from 0.5% to 8%, more preferably from 0.8% to 5% by weight with respect to the total weight of the composition (excluding the pasting water).

This component can be in liquid or powder form.

The solid composition or coating according to the present invention can also optionally comprise anhydrite or gypsum in a quantity ranging from 2 to 20%, preferably from 3 to 15% and more preferably from 3.5 to 10% by weight with respect to the total weight of the composition (excluding the pasting water).

The solid composition or coating according to the present invention can also optionally comprise various kinds of aggregates with a differing particle-size, in a quantity ranging from 5 to 60%, preferably from 10 to 50%, more preferably from 20 to 45% by weight with respect to the total weight of the composition (excluding the pasting water).

These percentages can also relate to the sum of different particle-size fractions.

The particle-size can be a maximum of 250 μm for spray applications.

The aggregates do not represent a critical aspect of the invention and can be suitably selected from calcareous, quartz or silico-calcareous aggregates, in any form (crushed, spherical, etc.).

The solid composition or coating according to the present invention can also optionally comprise mineral or pozzolanic additions in a quantity ranging from 0.5 to 15%, preferably from 1 to 10%, more preferably from 2 to 5% by weight with respect to the total weight of the composition (excluding the pasting water).

Mineral or pozzolanic additions refer to microsilica, silica smoke, slag, flying ashes, metakaolin and natural pozzolans.

The solid composition or coating according to the present invention can also optionally comprise pigments of an organic and/or inorganic nature in a quantity ranging from 0.01% to 1%, preferably from 0.05% to 0.5%, more preferably from 0.1 to 0.3% by weight with respect to the total weight of the composition (excluding the pasting water).

The solid composition or coating according to the present invention can also optionally comprise an ordinary cement according to the regulation EN 197-1 (2006).

Particularly preferred is the so-called Portland cement type 1 in a quantity ranging from 0.1% to 10%, preferably from 0.5% to 9%, more preferably from 1% to 6% by weight with respect to the total weight of the composition (excluding the pasting water).

The water in the coating according to the present invention can be present in such a quantity that the water/binder ratio (clinker) preferably ranges from 0.5 to 0.8.

The coating according to the present invention can be applied to a cementitious or non-cementitious type support, by spraying, with a brush or spatula.

In order to verify the properties relating to resistance to acid attack up to a pH of 1 and adherence of the coating object of the present invention to the substrate preferably consisting of cementitious pipes, the following test methods were adopted:

a) acid attack test

The acid attack tests were carried out according to what is specified in regulation UNI EN 295 $3^{rd}$ part for stone piping. They envisage an immersion for 48 hours in a solution of sulfuric acid at 1% by weight (pH<1) and the subsequent evaluation of the percentage weight loss. Non-coated cementitious-based systems are used as reference system, which show a weight percentage loss of around 4-5%. The test-samples treated with the coating or painting, object of the present invention, must undergo an aging of at least 28 days in air before being tested in an acid environment.

b) Adherence measurement of the painting.

The adherence measurement allows the performances of the coating to be evaluated after application on cementitious supports. Regulation UNI EN 1542 is a method for measuring resistance to adherence by the direct traction of mortar, used for the protection and repair of concrete structures.

The test consists in gluing metal disks onto a concrete support, after applying the coating. These disks are then torn away with an extraction apparatus. Visual analysis of this tear allows the type of breakage on the support to be defined and the adhesion strength of the coating or painting contemporaneously measured.

The characteristics and advantages of the coating according to the present invention will be better understood by the following detailed and illustrative description.

EXAMPLE 1

A coating or painting was obtained starting from the following formulation:

| | |
|---|---|
| Calcium sulfo-aluminous clinker | 59.7% |
| Fine calcareous sand (100 μm) | 14.9% |
| Quartz sand (0.06-0.25 mm) | 14.9% |
| Anhydrite | 6.0% |
| Culminal C4045 | 0.35% |
| Elotex AP200 | 3.0% |
| Melflux 1641 F | 1.1% |
| Water/binder | 0.7 |

This coating was obtained by mixing the components in powder form for 2 minutes, in an Eirich-type intensive mixer or in a Hobart-type planetary mixer, with the subsequent addition of the liquid components and prolonging of the mixing for a further 2 minutes.

The calcium sulfo-aluminous clinker contains 60% of $C_4A_3\bar{S}$, 9% of $C\bar{S}$, 21% of $C_2S$.

The commercial product Culminal C4045 is a methylcellulose modified with organic and inorganic additives, having a viscosity (measured on an aqueous solution at 2% at 20° C. using a Brookfield RV viscometer, 20 rpm) ranging from 38000 to 51500 mPa·s, falling within the general definition of the rheology modifying agent.

The commercial product Elotex AP200 is a polymeric binder based on vinyl acetate, vinyl versatates and butyl acrylate, falling within the general definition of the adhesion agent.

The commercial product Melflux 1641 F is a modified polycarboxylic ether falling within the general definition of the superfluidifying agent.

This formulation allows a coating or painting to be obtained, which can be easily applied either by spraying or with a brush, with an excellent applicability for about 45 minutes; in particular, coatings of about 250 μm in thickness, with an excellent surface finish were obtained by spray application. Sections of pipes coated with said painting show a weight percentage loss, after immersion in sulfuric acid, of less than 0.25% (maximum value allowed by the regulation UNI EN 295).

Tear tests effected according to the regulation UNI EN 1542 showed an excellent adherence of the coating or painting with tear resistance values equal to 1.20 N/mm².

EXAMPLE 2

A coating or painting was obtained starting from the following formulation, according to the procedures described in example 1:

| | |
|---|---|
| Calcium sulfo-aluminous clinker | 52.2% |
| Portland cement (CEM I-52.5R) | 5.2% |
| Anhydrite | 5.5% |
| Fine calcareous sand (100 μm) | 16.5% |
| Quartz sand (0.06-0.25 mm) | 16.5% |
| Elotex AP200 | 2.7% |
| Culminal C4051 | 0.08% |
| Melflux 1641 F | 1.31% |
| Water/binder | 0.5 |

The commercial product Culminal C4051 is a methylcellulose modified with organic and inorganic additives, having a viscosity (measured on an aqueous solution at 2% at 20° C. using a Brookfield RV viscometer, 20 rpm) ranging from 65000 to 85000 mPa·s, falling within the general definition of the rheology modifying agent.

This formulation allows a coating or painting to be obtained, which can be easily applied by spraying, with a discreet processability for about 1 hour obtaining coatings with a thickness of about 150 μm, with a good surface finish.

Sections of pipes coated with said painting show a weight percentage loss, after immersion in sulfuric acid, of less than 0.25% (maximum value allowed by the regulation UNI EN 295).

Tear tests effected according to the regulation UNI EN 1542 showed a good adherence of the coating or painting with tear resistance values equal to 0.80 N/mm$^2$.

EXAMPLE 3

A coating or painting was obtained starting from the following formulation, according to the procedure described in example 1:

| | |
|---|---|
| Calcium sulfo-aluminous clinker | 84% |
| Portland cement (CEM I-52.5R) | 8.3% |
| Elotex AP200 | 5.5% |
| Culminal C4045 | 0.3% |
| Cimfluid adagio P1 | 1.84% |
| Water/binder | 0.6 |

The commercial product Cimfluid Adagio P1 is a natural polycarboxylic polymer falling within the general definition of the superfluidifying agent.

This formulation allows a coating or painting to be obtained, which can be easily applied by spraying, with a good processability for about 1 hour obtaining coatings with a thickness of about 400 μm, with an excellent surface finish.

Sections of pipes coated with said painting show a weight percentage loss, after immersion in sulfuric acid, of less than 0.25% (maximum value allowed by the regulation UNI EN 295).

Tear tests effected according to the regulation UNI EN 1542 showed a good adherence of the coating or painting with tear resistance values equal to 0.95 N/mm$^2$.

EXAMPLE 4

A coating or painting was obtained starting from the following formulation, according to the procedure described in example 1:

| | |
|---|---|
| Calcium sulfo-aluminous clinker | 23.9% |
| Portland cement (CEM I-52.5R) | 28.7% |
| Fine calcareous sand (100 μm) | 21% |
| Quartz sand (0.06-0.25 mm) | 21% |
| Anhydrite | 2.6% |
| Culminal C4051 | 0.16% |
| Elotex AP200 | 1.3% |
| Melflux 1641 F | 1.1% |
| Water/binder | 0.6 |

This formulation allows a coating or painting to be obtained, which was applied by spraying using an aerograph on pipe sections, obtaining a poor surface finish with thicknesses varying from 300-600 μm and considerably reduced application times (about 15 minutes from the end of the preparation).

The immersion test in an acid environment showed a low resistance of the coating or painting to acid attack. After 48 hours of immersion, in fact, the acid attack caused the detachment of the paint from the support with the evident formation of precipitated compounds in the solution.

Figure 5:
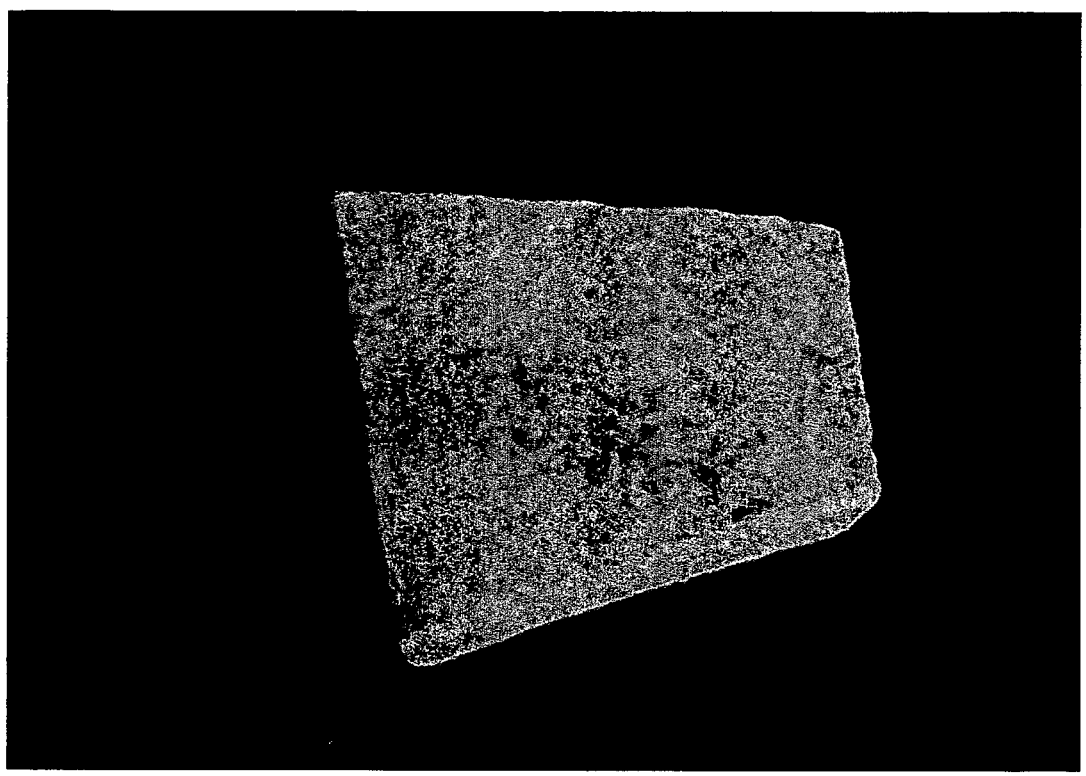
FIG. 5 is a photograph taken of a section of a pipe made of ordinary Portland cement after Immersion in acid.

The weight loss measured for the sample was equal to 3.5% due to the chemical attack on the ordinary Portland cement (see the photo provided in FIG. 5 which represents a section of coated pipe after immersion in the acid).

Tear tests effected according to the regulation UNI EN 1542 showed a reasonable adherence of the coating or painting with tear resistance values equal to 0.75 N/mm$^2$.

EXAMPLE 5

A coating or painting was obtained starting from the following formulation, according to the procedure described in example 1:

| | |
|---|---|
| Calcium sulfo-aluminous clinker | 46.1% |
| Portland cement (CEM I-52.5R) | 4.6% |
| Anhydrite | 5.1% |
| Fine calcareous sand (100 μm) | 20.2% |
| Quartz sand (0.06-0.25 mm) | 20.2% |
| Elotex AP200 | 2.5% |
| Culminal C4051 | 0.13% |
| Cimfluid Adagio P1 | 1.04% |
| Water/binder | 0.6 |

This formulation allows a coating or painting to be obtained, which can be easily applied by either spraying or with a brush with an excellent applicability for about 1 hour; in particular, coatings with a thickness of about 300 μm, with an excellent surface finish were obtained by spray application.

Sections of pipes coated with said painting show a weight percentage loss, after immersion in sulfuric acid, of less than 0.25% (maximum value allowed by the regulation UNI EN 295).

Tear tests effected according to the regulation UNI EN 1542 showed an excellent adherence of the coating or painting with tear resistance values equal to 1.32 N/mm$^2$.

EXAMPLE 6

A coating or painting was obtained starting from the following formulation, according to the procedure described in example 1:

| | |
|---|---|
| Calcium sulfo-aluminous clinker | 49.4% |
| Portland cement (CEM I-52.5R) | 10.8% |
| Anhydrite | 5.4% |
| Fine calcareous sand (100 μm) | 15.1% |
| Quartz sand (0.06-0.25 mm) | 15.1% |
| Elotex AP200 | 3.0% |
| Culminal C4045 | 0.35% |
| Melflux 1641 F | 0.75% |
| Water/binder | 0.7 |

This formulation allowed a coating or painting to be obtained, which was applied with a brush on pipe sections, obtaining a poor surface finish with thicknesses varying from 300-600 μm and considerably reduced application times (about 30 minutes from the end of the preparation).

The immersion test in an acid environment showed a low resistance of the coating or painting to acid attack. After 48 hours of immersion, in fact, the acid attack caused the detachment of the paint from the support with the evident formation of precipitated compounds in the solution.

The weight loss measured for the sample was equal to 2.5% due to the chemical attack on the ordinary Portland cement.

Tear tests effected according to the regulation UNI EN 1542 showed a reasonable adherence of the coating or painting with tear resistance values equal to 0.70 N/mm$^2$.

Bibliography

1. N. I. Fattuhi, B. P. Hughes, Cement and Concrete Research, 1988, vol. 18, pages 545-533
2. T. A. Duming, M. C. Hicks, Concrete Int., 1991, Vol. 13, pages 42-48
3. R. Di Maggio, W. Vaona, F. Girardi, F. Deflorian, Atti convegno "Sistemi fognari e ambiente" (Sewerage systems and environment)

The invention claimed is:

1. A solid composition based on a calcium sulfo-aluminous or calcium sulfo-ferroaluminous clinker, which comprises the following components:
   a) a calcium sulfo-aluminous or sulfo-ferroaluminous clinker in a quantity ranging from 15 to 95% by weight with respect to the total weight of the composition;
   b) at least one rheology-modifying agent with viscosity values ranging from 3000 mPa·s to 70000 mPa·s,
   c) at least one adhesion agent, and
   d) at least one superfluidifying agent.

2. The composition according to claim 1, characterized in that it comprises:
   a) a calcium sulfo-aluminous or sulfo-ferroaluminous clinker in a quantity ranging from 15 to 95% by weight with respect to the total weight of the composition;
   b) at least one rheology-modifying agent, in a quantity ranging from 0.01% to 3% by weight with respect to the total weight of the composition;
   c) at least one adhesion agent, in a quantity ranging from 0.1% to 10% by weight with respect to the total weight of the composition
   d) at least one superfluidifying agent, in a quantity ranging from 0.1% to 10% by weight with respect to the total weight of the composition; and
   e) at least one component selected from anhydrite or gypsum, mineral or pozzolanic aggregates, pigments of an organic and/or inorganic nature and/or an ordinary cement according to the regulation EN 197-1 (2006).

3. The composition according to claim 1, characterized in that the calcium sulfo-aluminous or sulfo-ferroaluminous clinker is present in a quantity ranging from 20 to 90% with respect to the total weight of the composition.

4. The composition according to claim 1, characterized in that the rheology modifying agent is a derivative of cellulose ethers with non-ionic alkyl substituents.

5. The composition according to claim 1, characterized in that the rheology modifying agent is present in a quantity ranging from 0.01 to 3%, by weight with respect to the total weight of the composition.

6. The composition according to claim 1, characterized in that the adhesion agent is present in a quantity ranging from 0.1% to 10%, with respect to the total weight of the composition.

7. The composition according to claim 1, characterized in that the adhesion agent is in the form of powder and/or liquid.

8. The composition according to claim 1, characterized in that the superfluidifying agent is present in a quantity ranging from 0.1% to 10%, with respect to the total weight of the composition.

9. The composition according to claim 1, characterized in that the superfluidifying agent is in liquid or powder form.

10. The composition according to claim 1, characterized in that it also comprises an anhydrite in a quantity ranging from 2 to 20%, with respect to the total weight of the composition.

11. The composition according to claim 1, characterized in that it also comprises aggregates in a quantity ranging from 5 to 60%, with respect to the total weight of the composition.

12. The composition according to claim 11, characterized in that the aggregates are a mixture of various kinds of aggregates, having a different particle-size.

13. The composition according to claim 11, characterized in that the quantity of aggregates relates to the sum of different particle-size fractions.

14. The composition according to claim 11, characterized in that the aggregates are selected from calcareous, quartz or silico-calcareous aggregates in any form.

15. The composition according to claim 14, characterized in that the particle-size of the aggregates is a maximum of 250 μm for spray applications.

16. The composition according to claim 1, characterized in that it also comprises mineral or pozzolanic additions in a quantity ranging from 0.5 to 15%, with respect to the total weight of the composition.

17. The composition according to claim 16, characterized in that the mineral or pozzolanic additions are selected from microsilica, silica smoke, slag, flying ashes, metakaolin and natural pozzolans.

18. The composition according to claim 1, characterized in that it also comprises pigments of an organic and/or inorganic nature in a quantity ranging from 0.01% to 1%, with respect to the total weight of the composition.

19. The composition according to claim 1, characterized in that it also comprises ordinary cement according to the regulation EN 197-1 (2006), in a quantity ranging from 0.1% to 10%, with respect to the total weight of the composition.

20. A coating based on a calcium sulfo-aluminous or calcium sulfo-ferroaluminous clinker, which also comprises a solid composition according to claim 1 and
   e) water in such a quantity that the water/binder ratio ranges from 0.4 to 0.9.

21. A coating based on a calcium sulfo-aluminous or calcium sulfo-ferroaluminous clinker, which comprises components a), b) c), d) and e), according to claims 2, and f) water in such a quantity that the water/binder ratio ranges from 0.4 to 0.9.

22. The coating according to claim 20, characterized in that the water/binder ratio ranges from 0.5 to 0.8.

23. The coating according to claim 20, wherein said coating can be applied to a support by spraying, with a brush or spatula.

24. A method of coating or painting cementitious and non-cementitious-based supports which comprises applying a coating as defined by claim 20.

25. A method of coating or painting of cementitious-based pipes which comprises applying a coating as defined by claim 20.

26. Cementitious pipes coated with a coating or painting based on a calcium sulfo-aluminous clinker according to claim 20.

27. A solid mixture of the additives b) c) and d) wherein b) is at least one rheology-modifying agent, with viscosity values ranging from 3000 mPa·s and 70000 mPa·s; c) is at least one adhesion agent, d) is at least one superfluidifying agent.

28. A solid mixture according to claim 27, characterized in that component b) is present in a quantity ranging from 0.5% to 20% by weight with respect to the total weight of the mixture of additives b), c) and d); component c) is present in a quantity ranging from 30% to 85% by weight of the mixture of additives b), c) and d); component d) is present in a quantity ranging from 5% to 60% by weight of the mixture of additives b), c) and d).

* * * * *